E. BAGNALL.
GLASS GRINDING TABLE.
APPLICATION FILED MAR. 31, 1916.

1,198,403.

Patented Sept. 19, 1916.
2 SHEETS—SHEET 1.

Witnesses:

Inventor:
Edward Bagnall

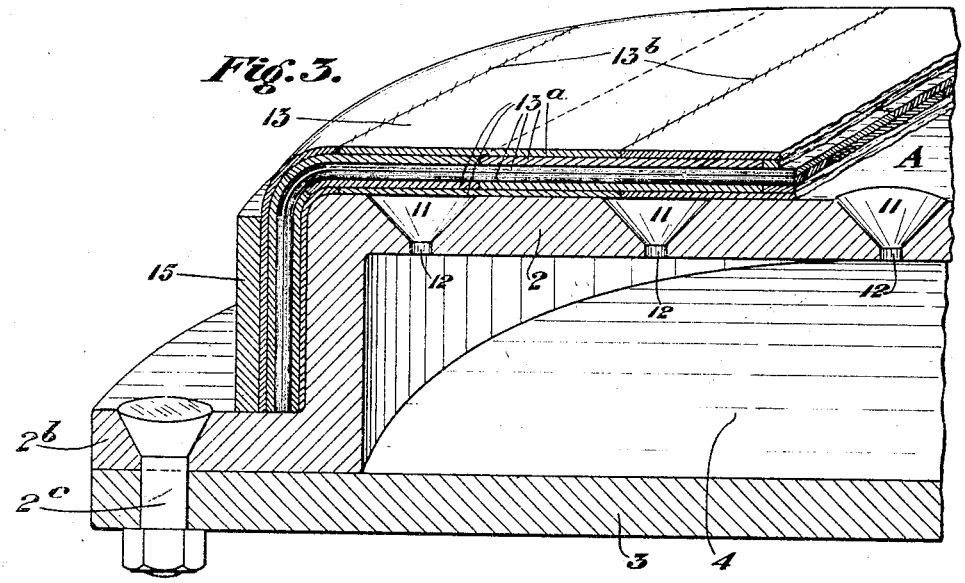
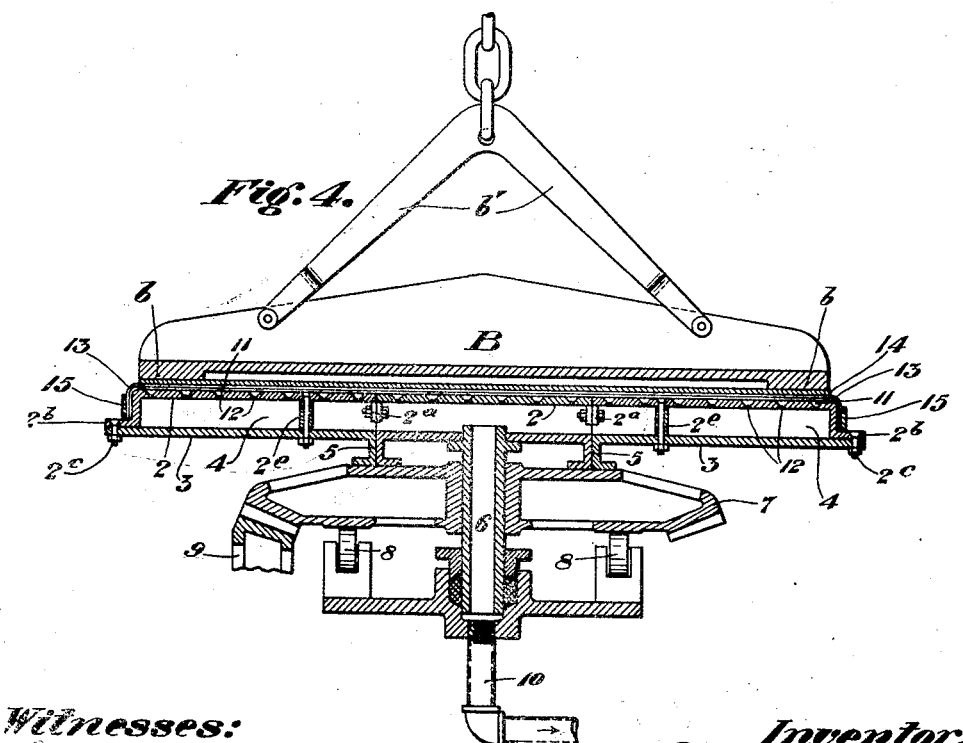

UNITED STATES PATENT OFFICE.

EDWARD BAGNALL, OF PITTSBURGH, PENNSYLVANIA, ASSIGNOR TO ZOFFER PLATE GLASS MANUFACTURING COMPANY, OF PITTSBURGH, PENNSYLVANIA, A CORPORATION OF WEST VIRGINIA.

GLASS-GRINDING TABLE.

1,198,403.  Specification of Letters Patent.  Patented Sept. 19, 1916.

Application filed March 31, 1916. Serial No. 88,113.

*To all whom it may concern:*

Be it known that I, EDWARD BAGNALL, a citizen of the United States, residing at Pittsburgh, in the county of Allegheny and State of Pennsylvania, have invented certain new and useful Improvements in Glass-Grinding Tables, of which the following is a specification.

My invention relates to improvements in apparatus for grinding, smoothing and polishing plate glass, and it has for its object to provide effective and economical means for cushioning and holding the glass plates upon the upper portion of the rotating table, in connection with the operations performed by the usual superimposed runners and abrasive material, and particularly refers to means for maintaining the cushioning material on the table.

The present invention constitutes an improvement in the same type of apparatus disclosed in my prior application, filed November 30, 1915, Serial No. 64245.

In carrying out my invention, the rotatable supporting table is provided with means for exhausting the air from its interior, and a plurality of numerous somewhat closely adjacent specially shaped perforating apertures communicating with the interior suction cavity of the table, adapted to support a pervious resilient bedding, upon which the glass plates are laid, whereby to provide for the necessary degree of compression of the bedding and the exhaustion of the air therethrough in effecting a partial vacuum and a resulting holding air pressure.

Further additional features of the invention are more fully hereinafter described, and in adapting the invention to its intended use, it will be understood that the construction of the superimposed glass bearing portion of the table, upwardly beyond the vacuum cavity, may be incorporated either in an entirely new table construction, or that it may be built upwardly upon a standard old form of table.

Preferred embodiments of the invention are shown in the accompanying drawings, in which—

Figure 1:
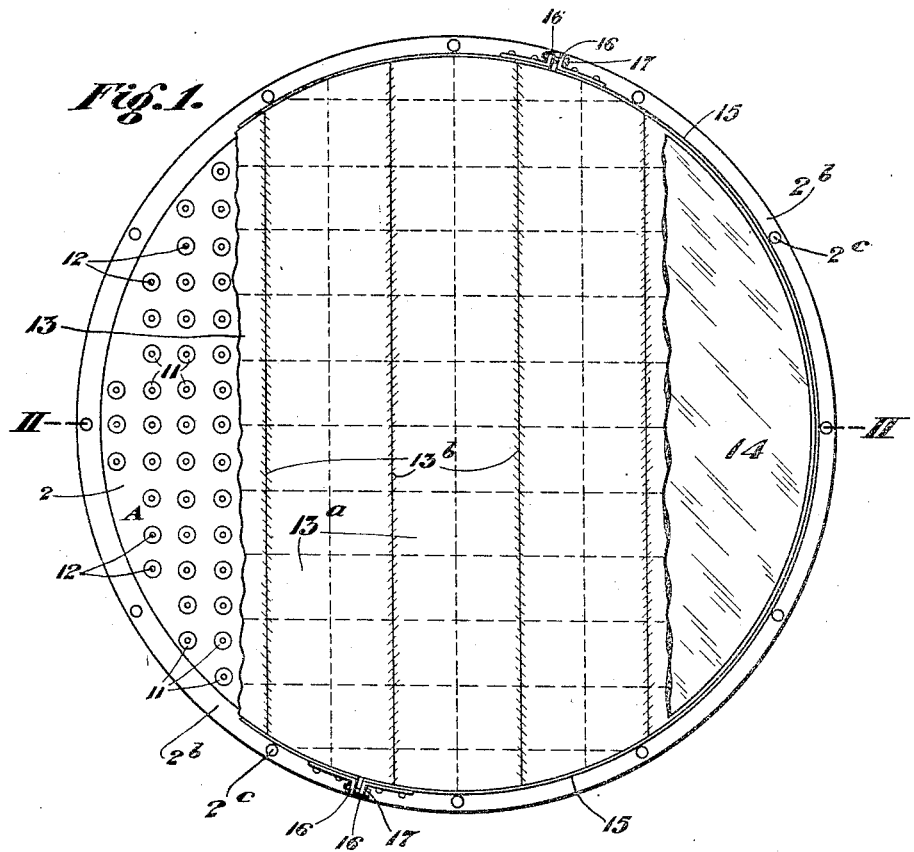
Figure 2:
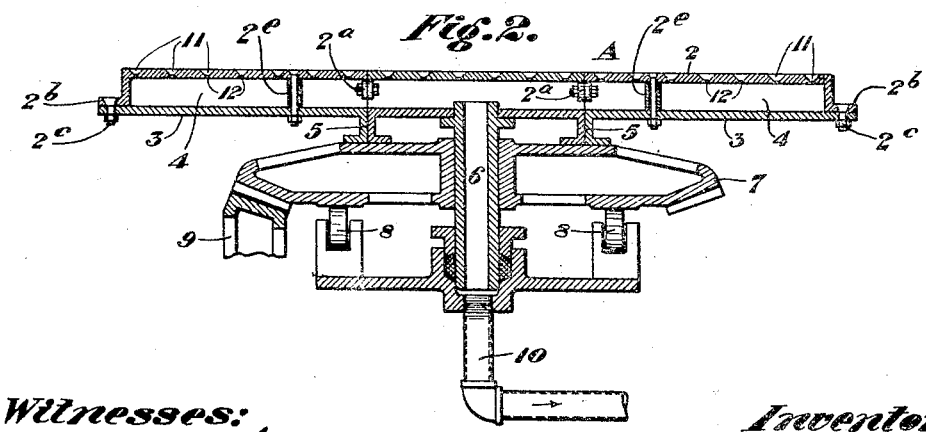

Figure 1 is a plan view of the apparatus showing certain of the exposed air circulating cavities, a portion of the bedding, and a portion of the glass plates carried thereby. Fig. 2 is a vertical cross section, indicated by the line II. II. of Fig. 1. Fig. 3 is an enlarged sectional detail view, showing the construction and manner of applying and holding the pervious bedding material. Fig. 4 is a view similar to Fig. 2, but showing the application of a pressure head or weight to the glass plates.

The rotatable glass supporting table A is preferably made of an upper wall 2 which is mounted above a main table 3, providing an interior air cavity 4. The main table 2 is preferably made in a plurality of sections and divided at the line 5, the sections constituting units of the complete table connected, as shown, and providing for the continuous circulation of the air throughout its entire interior by means of the central common rotatable air conduit or hollow spindle 6. Said spindle may be connected with the interior of the table in any suitable manner, operating as a hollow mast which may act as the main supporting stem or column of the table, and which may be provided with an actuating drum, pulley or gear wheel 7.

Said gear is rigidly incorporated with the table or its central mast in any suitable manner, as shown, preferably resting upon roller or ball bearings 8, and being driven by a gear wheel 9, or in any other suitable manner, as will be readily understood.

The central hollow spindle 6 is mounted in any suitable packed bearing, as indicated, and is in constant communication by suction pipe 10 with any suitable air exhausting mechanism. By this arrangement it will be readily seen that the interior of the table is in suction communication with such exhausting means at all times during its operation.

The upper wall 2 of the table, which is level and substantially smooth, is provided with numerous somewhat adjacent preferably coniform-shaped openings 11 flaring outwardly and providing a series of cup-shaped downwardly tapering cavities throughout the entire supporting area of the table, each of which is in communication with the main interior cavity 4 by means of a reduced communicating port 12.

The upper glass supporting table 2 is built upwardly above the lower main table 3, and may be of several sections, connected by bolts and flanges, as indicated at 2ª, and is secured to the outer rim portion of table 3 by flanges $2^b$ and bolts $2^c$, preferably flush with the upper face of flange $2^b$, so as to provide ample clearance for the holding band for the bedding material.

At intervals, the table 2 is braced away from and secured to table 3 by means of bolts extending downwardly through perforated studs or thimbles, $2^c$, whereby to rigidly maintain the upper glass supporting perforating table in fixed relation to the main supporting table, and providing ample circulating clearance between them.

For the purpose of providing a supporting bed for the plate glass, I lay completely over the entire area of the table A, and covering all of the cavities 11, a bedding 13 consisting of canton flannel, hair felt, cloth, or other suitable pervious material having sufficient body to provide a compressible supporting cushion for the plates 14.

The pervious bedding layer 13 may be in one continuous piece, laid across the entire surface of the table, but if necessary, it may be in two or more parts, having tightly contacting edges, whereby to avoid undue leakage, and it will thus serve to provide a practically uniform, level, resilient support for the glass plates.

In practice, I have used a plurality of circular layers $13^a$ of canton flannel, made of normal widths of material, laid edge to edge and stitched, as indicated at $13^b$, the seams thus not increasing the normal thickness, and preferably laid across the seams of the next under and upper layer, as clearly shown in Fig. 1.

For the purpose of fixedly holding the bedding 13 tightly down upon the surface of the entire table, I provide a clamping ring 15 of band iron or steel having at one or more locations tightening connecting joints, as by terminal flanges 16, 16, riveted to the ends of the band and drawn together by a bolt or bolts 17, as will be readily understood.

The band may be continuous with but one such tightening joint, or a plurality of such joints may be provided, as indicated in Fig. 1. The bedding material being composed of a number of layers, sewn together, overlapping and crossing each other in the manner clearly indicated in Fig. 1 and Fig. 3, provides a practically continuous flexible pervious bedding unobstructed by any projections, and capable of forming the continuous yielding support for the glass plates 14 laid thereon.

By means of the clamp as thus provided, the terminal edges of the bedding are drawn tightly over the peripheral corner of the vacuum table, avoiding any possibility of passage of dirt or foreign matter to the vacuum space, and enabling the removal of the bedding from time to time for cleaning or other purposes. The table being thus covered and the plates being in position, exhaustion of the air from cavity 4 will create a suction of the air through the pervious bedding 13 and cavities 11 and ports 12, resulting in a corresponding external air pressure which will bind the plates 14 firmly upon the bedding.

The bedding may be soaked with water, if desired, or merely dampened or used dry, depending upon the conditions present or the material used. I have also used oil in treating the flannel layers with good success, the oil tending to add to the resistance of the flannel to passage of moisture, and increasing its flexibility.

The degree of suction or maintenance of the vacuum may be readily controlled within the limits of the air exhausting means employed, and the thickness of the bedding, its resiliency and various other qualities or other different details of construction or utilization of the invention may be variously changed or modified by the skilled mechanic.

In Fig. 4, the construction of the table generally is the same as that of Fig. 2, but shows the bedding in position covered by the glass plates 14, and illustrates the use of my improved flattening weight B. Said weight is in the form of a disk, having a reinforcing rim $b$ whereby it may be lowered, and will rest with considerable pressure on the outer surrounding portion of the bedding 13, thereby tightly pressing the smaller pieces into intimate contact with the bedding during the commencement of the vacuum producing suction. The pressure disk B may be raised and lowered by suitable means, as a crane, connected with the head B by arms $b'$.

The advantages of the invention will be readily understood and appreciated by all those familiar with the construction and operation of glass grinding and polishing mechanism. It obviates the necessity of the usual cementing or other laborious and expensive methods in vogue for holding the glass plates to the table, providing for their easy and quick removal or reversal upon admission of air to the interior; it obviates the danger of breakage incident to the placing of the glass plates directly upon the metal surface of the table, and it provides a certain degree of cushioning action beneath the rotating superimposed runners, while compensating for any unevenness or inaccuracy in the plane of the table.

A further especial advantage is in the construction and mode of applying the means for securing the bedding to the surface and peripheral edge of the glass supporting table 2. Its peripheral rim portion extending downwardly at right angles to its bearing face, terminating in the flange $2^b$, provides a continuous drum surface for the tightening action of the band, with ample holding power thereof.

What I claim is:

In combination with a rotatable glass grinding table having a hollow interior and a plurality of adjacent openings through its upper wall communicating with an interior vacuum cavity, of a superimposed porous bed of compressible material composed of a plurality of layers, and a continuous annular tightening band clamping the terminal edge portion of said bedding to the edge of the table.

In testimony whereof I hereunto affix my signature in the presence of two witnesses.

EDWARD BAGNALL.

Witnesses:
W. A. HECKMAN,
C. M. CLARKE.